United States Patent [19]

Nietering

[11] Patent Number: 5,073,450
[45] Date of Patent: Dec. 17, 1991

[54] LAMINATED GLAZING UNIT

[75] Inventor: Kenneth E. Nietering, Dearborn, Mich.

[73] Assignee: Ford Motor Company, Dearborn, Mich.

[21] Appl. No.: 628,293

[22] Filed: Dec. 17, 1990

[51] Int. Cl.$^5$ .............................................. B32B 17/06
[52] U.S. Cl. ..................................... 428/336; 428/334;
428/426; 428/432; 428/433; 428/434; 428/437;
428/701; 359/359; 359/360; 359/589
[58] Field of Search ............... 428/426, 432, 433, 434,
428/436, 437, 701, 334, 336; 350/1.6, 1.7, 164, 166

[56] References Cited

U.S. PATENT DOCUMENTS

| | | | |
|---|---|---|---|
| 3,389,047 | 6/1968 | Lavin et al. | 428/437 |
| 3,649,359 | 3/1972 | Apfel et al. | 350/164 |
| 3,758,185 | 9/1973 | Gelber | 350/1.7 |
| 3,885,855 | 5/1975 | Gross | 350/166 |
| 3,990,784 | 11/1976 | Gelber | 428/432 |
| 4,045,125 | 8/1977 | Farges | 350/166 |
| 4,278,875 | 7/1981 | Bain | 219/522 |
| 4,413,877 | 11/1983 | Suzuki et al. | 350/1.7 |
| 4,450,201 | 5/1984 | Brill et al. | 428/432 |
| 4,465,736 | 8/1984 | Nishihara et al. | 428/334 |
| 4,782,216 | 11/1988 | Woodard | 219/203 |
| 4,799,745 | 1/1989 | Meyer et al. | 350/1.7 |
| 4,844,985 | 7/1989 | Pharms et al. | 428/432 |

Primary Examiner—James J. Seidleck
Assistant Examiner—Archene Turner
Attorney, Agent, or Firm—Charles H. Ellerbrock; Roger L. May

[57] ABSTRACT

A glazing unit comprises a substrate ply and a laminating ply laminated to a surface of the substrate ply. A coating on a laminated surface of the substrate ply is a film stack comprising a film of electrically conductive material covered by a film of dielectric material. The film of dielectric material immediately adjacent the laminating ply comprises a layer of silicon dioxide immediately adjacent the laminating ply and a layer of dielectric material of refractive index greater than 1.5 between the silicon dioxide and the conductive material. Applications include, for example, glazing units for solar load reduction and electrically heated glazing units.

11 Claims, 2 Drawing Sheets

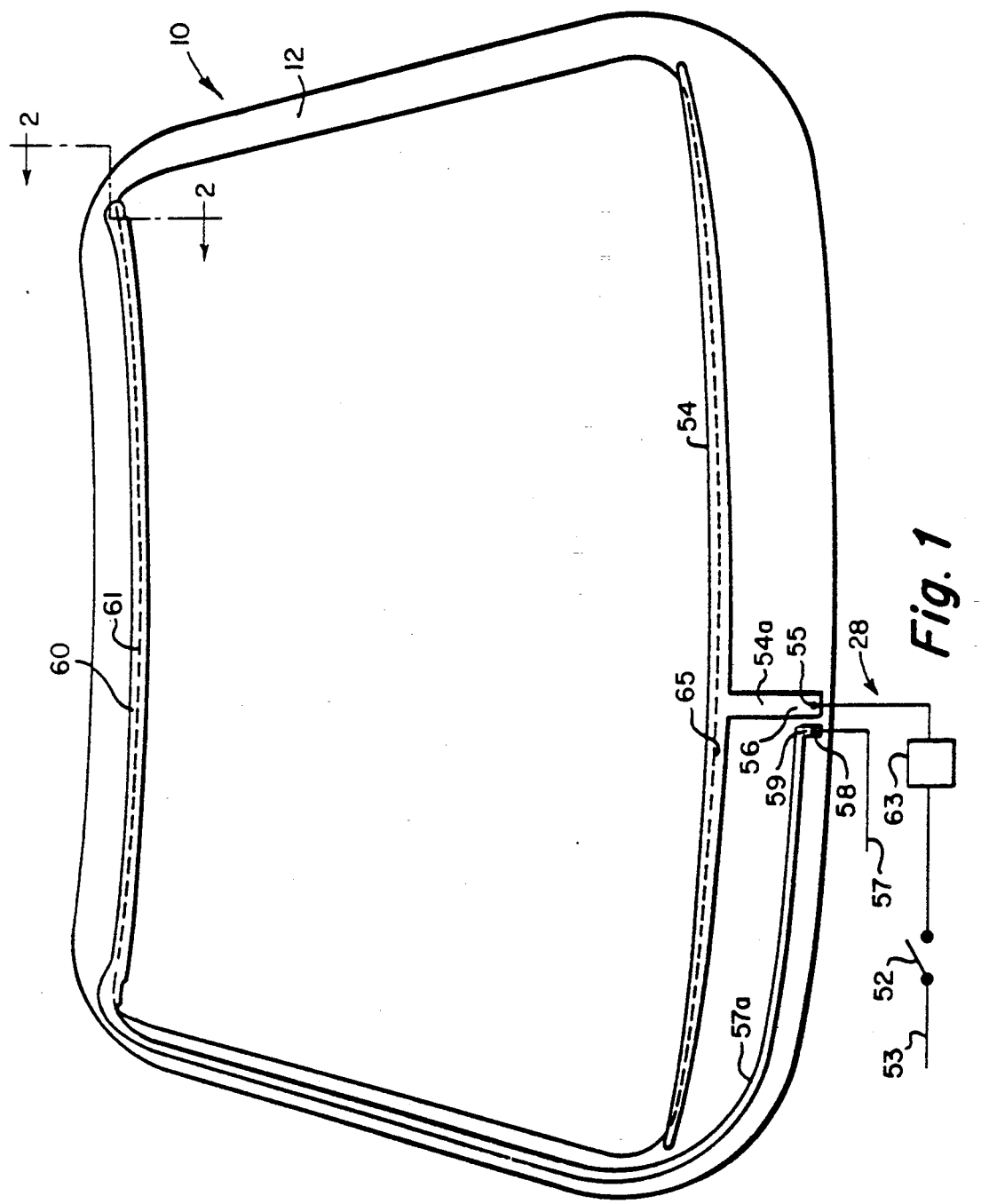

LAMINATED GLAZING UNIT

INTRODUCTION

The present invention is directed to a laminated vision unit in which a surface of a first ply coated with a substantially transparent, electrically conductive film stack is laminated to a second ply comprising a flexible polymeric material. More specifically, the invention is directed to improving the durability of the adhesion at the laminated interface between the two plys.

BACKGROUND OF THE INVENTION

Certain laminated glazing units, such as motor vehicle windshields and the like, are provided with a substantially transparent, electrically conductive coating at a laminated interface between adjacent plys. Such coatings are known for use, for example, to reduce the amount of infrared light transmitted through the glazing unit. Architectural and motor vehicle windows are provided with such coatings to reduce the amount of heat energy passing through the window to reduce the air conditioning load. Such coatings, commonly referred to as solar load reduction or SLR coatings, typically comprise a film stack wherein one or more films of electrically conductive metal alternate with films of dielectric material, such as metal oxide. The individual films within the film stack may be deposited onto a substrate, preferably a substantially rigid and inextensible ply of the glazing unit, such as an exterior glass ply, by pyrolytic deposition, sputter coating, or other technique known to those skilled in the art.

The same film stack technology also is used for electrically heating glazing units. That is, substantially transparent film stacks comprising electrically conductive metal films alternating with dielectric films can be connected to a power source, such as a motor vehicle battery, generator or alternator system, by suitable circuitry. The sheet resistance of the film stack is selected to provide a desirable rate of heat generation in response to electric current flow through the film stack. Motor vehicle windshields presently manufactured with such electrical heating means are known to employ a sputtered coating comprising a substantially transparent, electrically conductive film of silver metal sandwiched between films of zinc oxide.

Lamination of the surface of the glass ply (or other glazing unit ply) carrying the aforesaid film stack to a laminating material such as polyvinyl butyral (PVB) or other flexible, polymeric laminating material, is found to provide good interfacial adhesion. It has been found, however, that interfacial adhesion may be reduced by prolonged exposure to UV radiation, such as the UV component of sunlight. This is found to be true particularly in the case of PVB and other flexible polymeric laminating materials having an alcoholic hydroxyl group (R-OH). For purposes of improving the durability of glazing units having a laminated interface between a surface of a ply coated with a substantially transparent, electrically conductive film stack and a ply of flexible, polymeric laminating material, there is a need to improve the durability of the adhesion between such film stack and the laminating material against prolonged exposure to UV radiation. Improved interfacial adhesion is taught in U.S. Pat. No. 4,844,985 to Pharms et al, assigned to Ford Motor Company, wherein a barrier or adhesion layer of chromium oxide complex is taught. Specifically, a thin layer of chromium oxide complex is deposited over a zinc oxide dielectric layer in a film stack comprising alternating layers of silver and zinc oxide. This enhances the durability of the interfacial adhesion to PVB and like laminating materials. The use of a chromium oxide complex barrier or adhesion layer, however, imparts a certain degree of "color" to the glazing unit due to its refraction and absorbance properties. A substantial need exists, therefore, to improve interfacial adhesion durability while imparting less color to the glazing unit than does chromium oxide complex.

It is an object of the present invention to improve the durability of laminated glazing units by improving the durability of such interfacial adhesion against prolonged exposure to UV radiation. Additional objects and advantages of the invention will be understood from the following disclosure thereof and detailed description of various preferred embodiments.

SUMMARY OF THE INVENTION

According to the present invention a laminated glazing unit is provided comprising at least a substrate ply and a laminating ply laminated to a surface of the substrate ply. A substantially transparent, electrically conductive coating is provided on the laminated surface of the substrate ply, that is, at the interface between the substrate ply and the laminating ply. The coating comprises a film stack in which at least one film of electrically conductive material, such as silver metal, is sandwiched between films of dielectric material. The film of dielectric material adjacent the laminating ply comprises a layer of silicon dioxide immediately adjacent the laminating ply and a layer of dielectric material of refractive index greater than about 1.5 between the silicon dioxide and the film of electrically conductive material.

As described in detail below, the silicon dioxide layer preferably is relatively thin in comparison to the layer of dielectric material of refractive index greater than about 1.5. It has been found that even an ultra-thin layer of silicon dioxide substantially improves the durability of the interfacial adhesion with the polymeric laminating layer against exposure to UV radiation. While not intending to be bound by theory, this may be due at least in part to the fact that silicon dioxide is more chemically inert than zinc oxide and the various other materials previously employed in such films stacks. In addition, silicon dioxide has less color than chromium oxide, which is important in controlling the final appearance of the glazing unit. In fact, since silicon dioxide has a refractive index close to that of PVB, the reflectance of the glazing unit is not substantially changed by the use of the silicon dioxide adhesion layer. Specifically, silicon dioxide has a refractive index of only approximately 1.47. For the same reason, however, silicon dioxide does not replace entirely the zinc oxide or other dielectric material presently known for use in such film stacks. Specifically, for example, in a film stack comprising alternating layers of silver metal and zinc oxide, replacing an outside film of zinc oxide entirely with silicon dioxide would result in a glazing unit having higher than desirable reflectance of visible light. That is, due to its low refractive index, silicon dioxide alone would not provide sufficient anti-reflection effect for the underlying electrically conductive silver metal layer, as does a dielectric material having a refractive index greater than 1.5. Thus, the use of silicon dioxide alone as the material of the dielectric film sandwiching a silver or other metal electrically conductive film would involve disadvantages both with respect to the appearance of the glazing unit, that is, greater reflectance of visible light, and also with respect to the transmittance of visible light through the glazing unit, which can be important in meeting architectural needs and government regulations regarding automotive glazing. Thus, the use of zinc oxide or other dielectric material having a refractive index greater than 1.5 is necessary to decrease the reflectivity of the glazing unit and, hence, increases the transmittance of visible light. Accordingly, significant advantages are achieved by the dielectric film of the present invention comprising a dielectric material of refractive index greater than 1.5 coupled with a silicon dioxide adhesion layer immediately adjacent the laminating ply, advantages not obtainable by the use of either of such materials alone.

In addition, silicon dioxide sputters relatively slowly compared to zinc oxide and other known dielectric materials. Hence, it would be time consuming and more costly to use silicon dioxide alone in adequate thickness as the dielectric material in a sputtered film stack sandwiching a silver metal or other electrically conductive film. Used as a thin layer for purposes of improving adhesion, however, the time and cost penalty is quite acceptable in view of the greatly improved interfacial adhesion durability it provides. The present invention is a significant technological advance for all these reasons.

Additional features and advantages of the invention will be better understood from the appended drawings and the following detailed description of certain preferred embodiments of the invention.

BRIEF DESCRIPTION OF THE DRAWINGS

In the following description of certain preferred embodiments of the invention, reference will be made to the accompanying drawings wherein:

FIG. 1 is a schematic plan view of an electrically heated motor vehicle windshield according to a preferred embodiment of the invention;

DETAILED DESCRIPTION OF PREFERRED EMBODIMENTS

Figure 3:
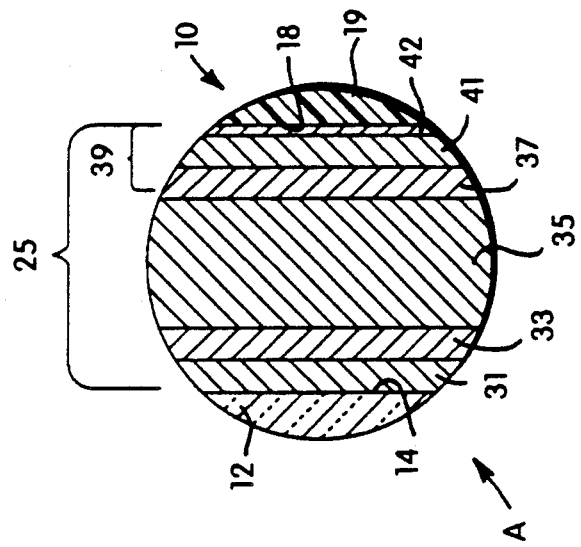
FIG. 3 is an exploded view of area A of FIG. 2.
Figure 2:
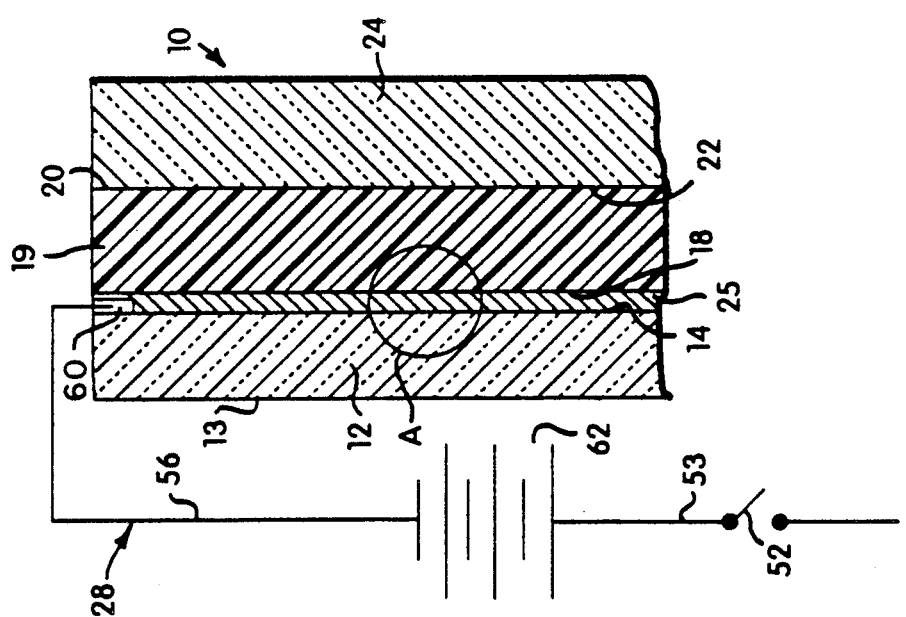
FIG. 2 is a schematic, cross-section view through line 2—2 in FIG. 1.

The glazing unit 10 illustrated in FIGS. 1-3 is a preferred embodiment of the invention adapted for use as a motor vehicle windshield. As described below, it comprises an SLR film, specifically, a Fabry-Perot interference filter for solar load reduction. In addition, means are provided for passing an electrical current through the SLR film for electrically heating the windshield. The Fabry-Perot interference filter has selectively low transmissivity of infrared radiation, while having relatively higher transmissivity of visible wavelength light. Windshield 10 is seen to comprise an outer glass ply 12 having an exterior surface 13 and an interior laminated surface 14. Various suitable alternative substrate ply materials are commercially available. Preferably an inextensible material is employed to facilitate deposition and to protect the integrity of the film stack. Suitable inextensible plastic materials include, for example, polyethylene terephthalate. The interior surface of the outer glass ply 12 is laminated to a first surface 18 of a laminating ply 19 of PVB. The opposite surface 20 of the PVB ply is laminated to surface 22 of a second glass ply 24, such that the PVB is sandwiched between glass plys 12 and 24.

Laminated surface 14 of glass ply 12 carries a sputtered coating 25. Thus, coating 25 is at the laminated interface between glass ply 12 and PVB ply 19. Coating 25 is a substantially transparent, electrically conductive Fabry-Perot interference filter able to selectively reject a substantial portion of the infrared radiation of normal sunlight while transmitting through the glazing unit at least about 70% of the visible wavelength portion of normal sunlight. Thus, coating 25 functions as a solar load reduction coating. In addition, means 28 is provided for passing an electrical current through coating 25 for electrically heating the coating and, therefore, the glazing unit to defog or deice the glazing unit. Electrical circuit means 28 comprises, in addition to the electrically conductive SLR film stack 25, an on/off switch 52 interrupting electrical lead 53 which extends to a bus bar 54 at the lower edge 65 of the SLR film stack via connection means, specifically, solder pad connection 55 at the terminus 56 of lead 54a within the laminated unit. Similarly, electrical lead 57 extends from solder pad connector 58 at terminus 59 of lead 57a to bus bar 60 at the top edge 61 of the SLR film stack. The electrical power source, in the case of a motor vehicle, is preferably the motor vehicle alternator system. The bus bars 54 and 60 and electrical leads 54a and 57a can be formed by silk screening a conductive ceramic paint onto the surface of the glass ply 12, or by other methods known to the skilled of the art. To provide good distribution of electrical power, and hence heating, in the SLR element, the bus bars, as shown, preferably comprise a pair of spaced, substantially parallel, elongate bus bars in electrical contact with opposite edges of the SLR film stack. Since the lower bus bar is longer than the upper bus bar, a recess preferably is provided at the left side (as viewed in FIG. 1) of the lower edge of the upper bus bar. A similar recess should be provided on the right side if a second electrical lead is used to connect the right side of the upper bus bar to the electrical circuit. A recess also is desirable at the intersection of the upper bus bar with the edge of the SLR film stack. The recesses serve to more evenly distribute electrical power. Suitable fault detection circuitry 63 can be incorporated in the manner known to the skilled of the art.

Referring now specifically to FIG. 3, sputter coating 25 is seen to be a film stack wherein a dielectric film 31 of zinc oxide is deposited directly on laminated surafce 14 of glass ply 12. An electrically conductive film 33, preferably silver metal, covers dielectric film 31. A second dielectric film 35, preferably a second film of zinc oxide, covers electrically conductive film 33. Next, a second electrically conductive film 37, preferably a second film of silver metal, covers dielectric film 35. Finally, dielectric film 39 covers electrically conductive film 37. More specifically, dielectric film 39 consists essentially of (i) a layer 41 of dielectric material having an index of refraction greater than 1.5, preferably zinc oxide, immediately adjacent the silver metal film 37, and (ii) a layer 42 of silicon dioxide immediately adjacent layer 41 on one side and laminated surface 18 of PVB ply 19 on the opposite side. It will be recognized by those skilled in the art that both electrical heating and SLR functionality can be achieved with a Fabry-Perot interference filter as just described without the second film of zinc oxide and the second film of silver. The present invention is, of course, equally applicable to such an embodiment (and to innumerable other variations).

Silicon dioxide can be deposited as the adhesion promoting layer in a film stack in accordance with equipment and methods known to those skilled in the art. Thus, for example, silicon dioxide films of sufficient uniformity and thickness can be deposited by sputtering onto a previously deposited zinc oxide film or other dielectric material film. In a motor vehicle windshield in accordance with the preferred embodiment described herein, a silicon dioxide layer typically would have a thickness of about 2 to 20 nm, more preferably about 3 to 7 nm. In addition, silicon dioxide films of the invention can be deposited by chemical vapor deposition techniques, electron beam evaporation processes, etc.

In one highly preferred embodiment dielectric film 31 is a sputtered film of zinc oxide approximately 28 to 42 nm thick, most preferably about 38 nm thick; electrically conductive film 33 is a sputtered film of silver metal approximately 7 to 9 nm thick, most preferably about 8 nm thick; second dielectric film 35 is a sputtered film of zinc oxide approximately 60 to 100 nm thick, most preferably about 80 nm thick; second electrically conductive film 37 is a second sputtered film of silver metal approximately 7 to 9 nm thick, most preferably about 8 nm thick; and dielectric film 39 is a third sputtered film of zinc oxide about 28 to 42 nm thick, most preferably about 38 nm thick, with an ultra-thin film of silicon dioxide sputtered over the third film of zinc oxide. The silicon dioxide layer preferably has a thickness of about 2 to 20 nm thick, more preferably about 3 to 7 nm, most preferably about 5 nm.

Where sputter deposition of a zinc oxide film over a silver film is to be accomplished using a zinc metal target in an oxidizing atmosphere, a thin film of zinc metal can be deposited first onto the silver metal, prior to introducing the oxidizing atmosphere, to protect the silver metal from oxidizing, the amount of zinc metal deposited should be that which will substantially entirely oxidize after introduction of the oxidizing atmosphere, but which prevents any substantial amount of the silver metal from oxidizing. The following example illustrates the efficacy of an embodiment of the invention suitable for use in a motor vehicle windshield application.

EXAMPLE

The durability of the interfacial adhesion between a coated surface of a substrate ply and a laminating ply in a laminated glazing unit in accordance with a preferred embodiment of the invention was evaluated. The evaluation was conducted by comparing the interfacial adhesion provided by the silicon dioxide adhesion film of the invention to the interfacial adhesion provided by adhesion films previously considered by those skilled in the art, i.e., films of zirconium oxide and titanium oxide. Specifically, the durability of such interfacial adhesion against prolonged exposure to UV radiation was tested by means of the pummel test, which test is well known and used in the testing of motor vehicle laminated windshields. In the pummel test, a test piece of the laminated glazing unit, typically 150 mm by 150 mm, is soaked at 0° F. for a period of two hours. The test piece is removed and subjected to overall pummeling by hydraulic hammer and then evaluated for pummel adhesion value by comparison to standards distributed by Monsanto Company, St. Louis, Mo., a supplier of PVB. If all of the glass substrate ply delaminates from the PVB laminating layer, a test result of 0 is given to the test sample. If all the glass is retained in bonding contact with the PVB, a test result of 10 is given to the test piece. A pummel test score in the range of about 3 to 7 is normally targeted for a motor vehicle windshield. In the present tests the principle objective is to determine the degree to which adhesion is lost by exposure to UV radiation. Good interfacial adhesion durability is demonstrated if the pummel test score does not change (i.e., decrease) significantly after exposure to UV radiation. Two test pieces, as described, were prepared from each of the following test samples. The test samples were substantially identical to each other except as specifically noted.

Test Sample No. 1—Two glass substrate plys, each 2.3 mm thick, are laminated to opposite sides of a PVB laminating ply which is 0.76 mm thick. The laminated surface of the first glass ply is sputter coated with a film stack consisting of, in order, a 48 nm thick zinc oxide film, a 12 nm thick silver metal film, a 48 nm thick second zinc oxide film and a 5 nm thick zirconium oxide ($ZrO_2$) adhesion film The zirconium oxide adhesion film is immediately adjacent the PVB.

Test Sample No. 2—Same as Test Sample No. 1 except that the sputtered adhesion film between the second zinc oxide film and the PVB laminating layer is a 5 nm thick titanium oxide ($TiO_2$) film.

Test Sample No. 3—Same as Test Sample No. 1 except that the sputtered adhesion film between the second zinc oxide film and the PVB laminating layer is a 5 nm thick silicon dioxide film.

The test pieces underwent accelerated UV testing by exposure in a fadeometer in accordance with ANSI procedure Z26.1, test no. 1, followed by pummel testing. The results of the pummel tests conducted on the test pieces of each of the above Test Samples are presented in the following table.

| Test Sample | Pummel Test Results | |
| --- | --- | --- |
| | Hours of Accelerated UV Exposure | Pummel Test Score |
| No. 1 | 0 | 8 |
| | 100 | 3.5 |
| | 300 | 2 |
| No. 2 | 0 | 8 |
| | 100 | 0.5 |
| | 300 | 0 |
| No. 3 | 0 | 6 |
| | 100 | 6 |
| | 225 | 6 |
| | 300 | 6 |
| | 500 | 6 |

From the above test results it can be seen that even after 500 hours of accelerated UV exposure in a fadeometer, there is no measured decrease in the pummel score of the test pieces of laminated glazing unit Test Sample No. 3, having sputter coatings in which a silicon dioxide adhesion film is interposed between a PVB laminating layer and a zinc oxide dielectric film. These test pieces show no loss of interfacial adhesion after the prolonged exposure to UV radiation. In contrast, the pummel test score of Test Sample No. 1, having a zirconium oxide adhesion film, drops to 2 after 300 hours of accelerated UV exposure. For Test Sample No. 2, with a titanium oxide adhesion layer, the pummel test score dropped to zero after 300 hours of accelerated UV exposure. Accordingly, the glazing unit samples embodying the present invention performed significantly better than either of the other two samples embodying prior technology.

Although the invention is described herein with reference to preferred features and embodiments, it will be understood by those skilled in the art in view of this disclosure that various alterations, substitutions and modifications may be made without departing from the true scope and spirit of the invention as defined by the following claims.

I claim:

1. A laminated glazing unit comprising a substrate ply and a laminating ply of polymeric material, having a surface laminated to a substrate ply surface, a substantially transparent, electrically conductive coating on the substrate ply surface comprising a film stack wherein a film of electrically conductive material is covered by a first film of dielectric material, the first film of dielectric material comprising:

a layer of silicon dioxide immediately adjacent the laminating ply; and a layer of dielectric material of refractive index greater than about 1.5 between the layer of silicon dioxide and the film of electrically conductive material.

2. The laminated glazing unit of claim 1 further comprising a second film of dielectric material, the film of electrically conductive material being sandwiched between the first and second film of dielectric material, wherein the second film of dielectric material and the layer of dielectric material each consists essentially of zinc oxide.

3. The laminated glazing unit of claim 1 wherein the electrically conductive material consists essentially of silver metal.

4. The laminated glazing unit of claim 1 wherein the substrate ply material is selected from the group consisting of glass and substantially inextensible plastic.

5. The laminated glazing unit of claim 1 wherein the laminating ply is flexible, alcoholic-hydroxyl group-bearing polymeric material.

6. The laminated glazing unit of claim 5 wherein the laminating ply is polyvinylbutyral.

7. The laminated glazing unit of claim 1 wherein the layer of silicon dioxide is substantially thinner than the layer of dielectric material.

8. The laminated glazing unit of claim 2 wherein the layer of dielectric material is substantially as thick as the second film of dielectric material and the layer of silicon dioxide is about 2 to 10 nm thick.

9. The laminated glazing unit of claim 8 wherein the layer of silicon dioxide is about 3 to 7 nanometers thick.

10. The laminated glazing unit of claim 1 where the coating is substantially coextensive with the laminated interface between the substrate ply and the laminating ply.

11. A laminated glazing unit comprising a substantially inextensible substrate ply having a surface laminated to a ply of polyvinyl butyral, a substantially transparent, electrically conductive coating on the surface of the substrate ply comprising a film stack wherein an electrically conductive film of silver metal is sandwiched between a dielectric film on one side and a zinc oxide film on the other., the dielectric film consisting of:

a layer of $SiO_2$ about 2 to 10 nanometers thick immediately adjacent the polyvinyl butyral; and a layer of zinc oxide substantially as thick as the film of zinc oxide, immediately adjacent the $SiO_2$ on one side and the film of silver metal on the other.

* * * * *